Figure 1:
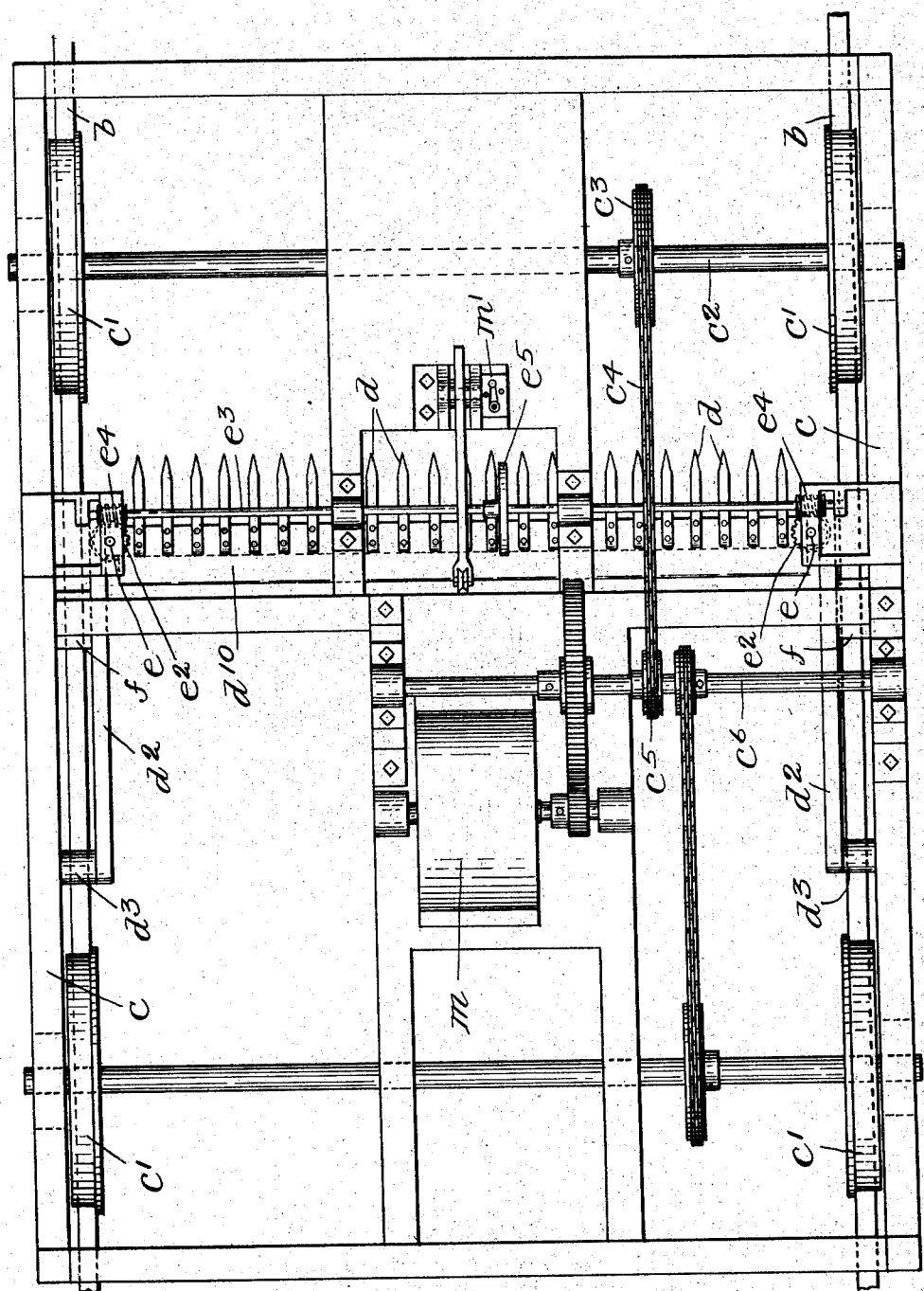

T. A. MIGHILL.
APPARATUS FOR TURNING PEAT BLOCKS.
APPLICATION FILED MAR. 27, 1911.

1,015,390.

Patented Jan. 23, 1912.

3 SHEETS—SHEET 1.

Witnesses:
H. B. Davis.
H. McDonald

Inventor:
Thomas A. Mighill
by Noyes & Harriman
Attys.

T. A. MIGHILL.
APPARATUS FOR TURNING PEAT BLOCKS.
APPLICATION FILED MAR. 27, 1911.
1,015,390.
Patented Jan. 23, 1912.
3 SHEETS—SHEET 2.
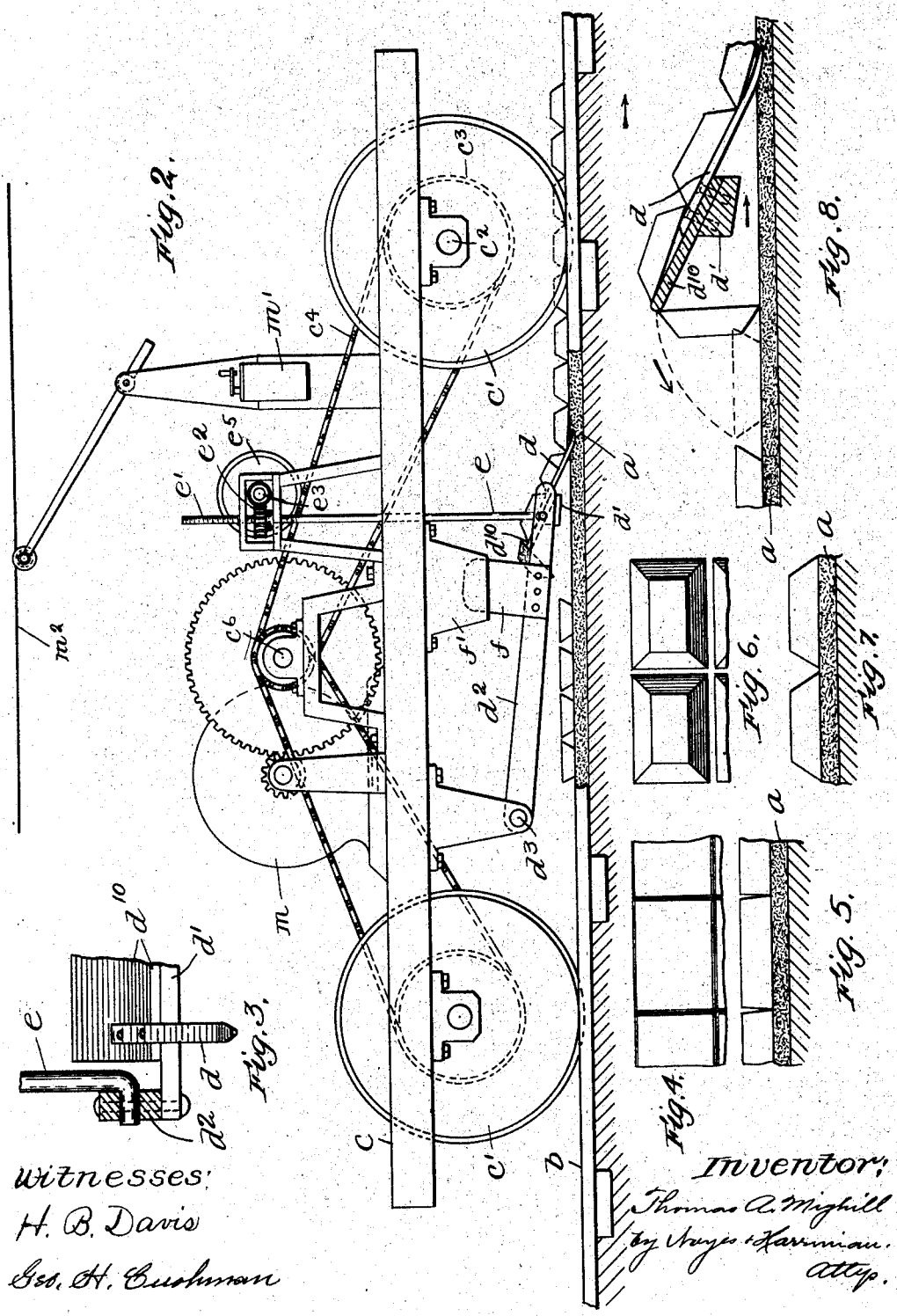
Witnesses:
H. B. Davis
Geo. H. Cushman
Inventor:
Thomas A. Mighill
by Noyes & Harriman
Attys.

T. A. MIGHILL.
APPARATUS FOR TURNING PEAT BLOCKS.
APPLICATION FILED MAR. 27, 1911.

1,015,390.

Patented Jan. 23, 1912.

3 SHEETS—SHEET 3.

Witnesses:
H. B. Davis.
Geo. H. Cushman.

Inventor:
Thomas A. Mighill
by Noyes & Harriman
Attys.

UNITED STATES PATENT OFFICE.

THOMAS A. MIGHILL, OF CAMBRIDGE, MASSACHUSETTS.

APPARATUS FOR TURNING PEAT BLOCKS.

1,015,390.   Specification of Letters Patent.   Patented Jan. 23, 1912.

Application filed March 27, 1911. Serial No. 617,059.

*To all whom it may concern:*

Be it known that I, THOMAS A. MIGHILL, residing at Cambridge, in the county of Middlesex and State of Massachusetts, have invented an Improvement in Apparatus for Turning Peat Blocks, of which the following is a specification.

In the system of drying peat forming the subject-matter of my application for Letters Patent No. 617,060 filed March 27, 1911 a level-surfaced bed of finely divided dry peat is employed as a drying bed, on which the wet peat reposes while drying. The wet peat is arranged on the drying-bed in blocks, as for instance by a machine such as shown in my application Serial No. 617,061 filed March 27, 1911; and these blocks, when partially dry, are turned over and the drying operation permitted to continue until completed, when the blocks are picked up and transported from the bed.

This invention has for its object the construction of an apparatus adapted to be operated by power to automatically turn over the partially dried blocks of peat rapidly and uniformly, as the apparatus advances, so that in a short period of time the blocks reposing on a bed of large area may be turned over.

In one embodiment of my invention the apparatus is adapted to be operated in connection with a drying-bed of finely divided dry peat, prepared between a pair of rails on which the apparatus may be propelled, which method has great advantages, but its essential principles are not confined to use in connection with such a bed.

The invention comprehends essentially a block-turning device adapted to be held in any fixed position of adjustment, which acts to turn the blocks on the principle of lifting them from the bed, and causing them to move up an inclined plane and over the top thereof, whereupon they fall by gravity upon the bed, a turning motion being imparted to them when thus passing over the top of the inclined plane.

In one embodiment of my invention the block-turning device involves a set of inclined block-lifting fingers and an inclined block-turning board, said fingers being arranged and supported so that when moved forward their lower forward ends will pass beneath the blocks successively, and the blocks will be lifted and the succeeding blocks caused to push the blocks ahead of them up and along the inclined fingers and turning-board and finally over the edge of said turning-board, whereupon they turn and fall by gravity to the bed.

The top edge of the block-turning device is arranged but a short distance above the bed, a distance not much greater than the length of a block, so that the blocks when falling will strike endwise on the bed, and will tip in a rearward direction. As the blocks pass from the top edge of the block-turning device a turning motion is imparted to them so that when they strike the bed they still have a tendency to tip rearward. To further insure the blocks tipping rearward when striking the bed advantage is taken of the fact that the blocks, when partially dry, have inclined or beveled ends and sides, the tops of the blocks being of smaller area than the bottoms, due to shrinkage, and as the blocks fall the acute angled corners of the inclined or beveled ends thereof first strike the bed, so that the blocks will almost invariably immediately tip over in a rearward direction.

Figure 9:
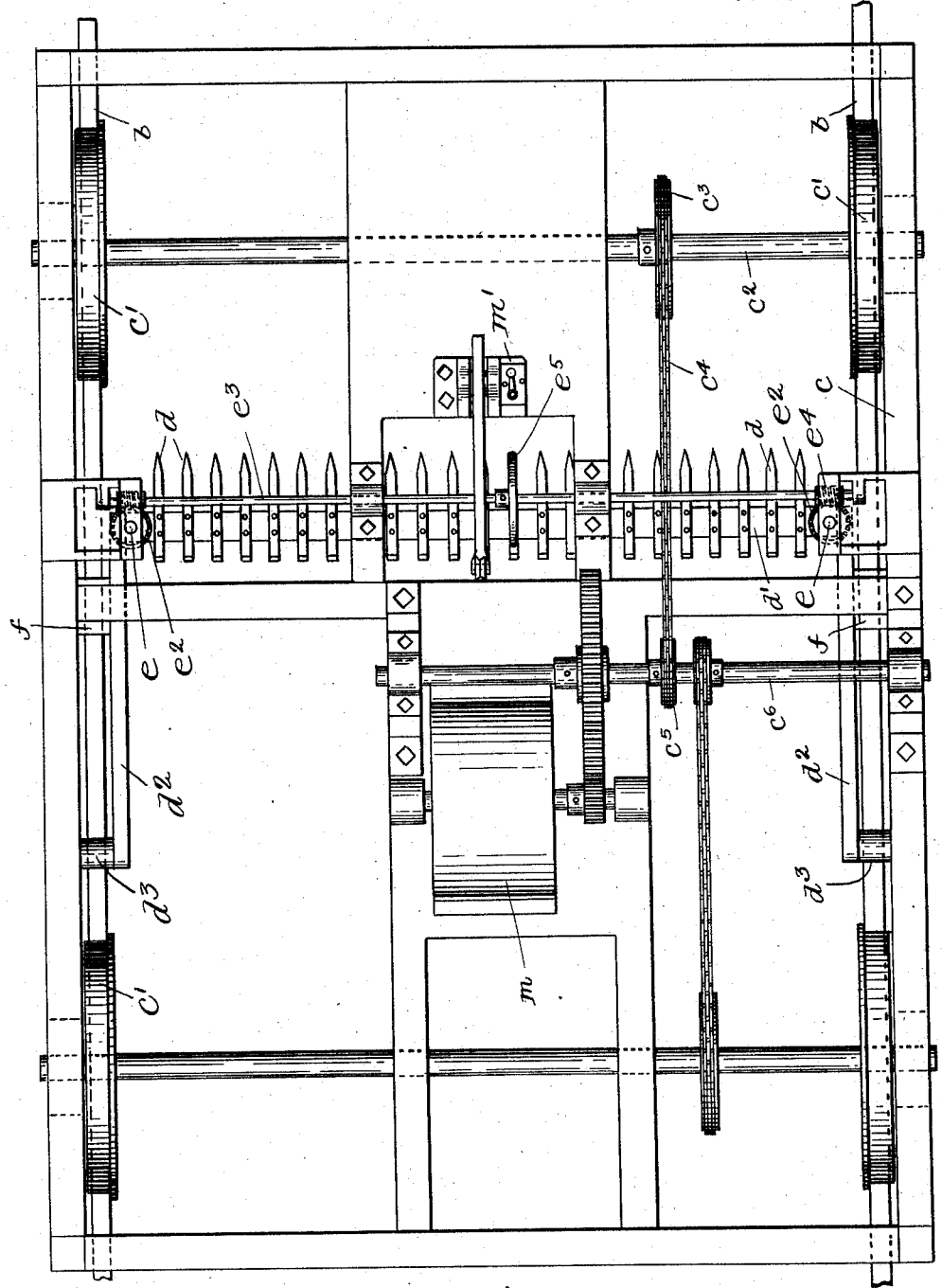

Figure 1 is a plan view of an apparatus for turning peat-blocks embodying this invention. Fig. 2 is a side elevation of the same. Fig. 3 is a fragmentary view, in section, to be referred to. Figs. 4 and 5, respectively, are conventional plan and sectional views of a portion of a drying-bed with wet peat arranged thereon in the form of blocks. Figs. 6 and 7, respectively, are conventional plan and sectional views of a drying-bed and partially dried peat blocks thereon. Fig. 8 is a view illustrating the manner of turning the blocks. Fig. 9 is a plan view of an apparatus having a modified form of block-turning device.

$a$ represents a drying-bed of finely divided dry peat, although it may be composed of any other suitable material, so far as my present invention is concerned. This bed, as here shown, is prepared between a pair of rails $b$, $b$, on which the apparatus for turning the blocks on the bed is adapted to be moved along, by power or otherwise.

$c$ is the main frame of the block-turning apparatus, bearing a set of wheels $c'$ adapted to run on the rails $b$, $b$, which may be driven by any suitable means, preferably by power, as for instance the axles $c^2$, bearing the wheels may have sprocket-wheels $c^3$ which receive upon them chains $c^4$, which pass around sprocket-wheels $c^5$, secured to a driving-shaft $c^6$, which may be operated by a motor of any suitable description, or may be driven by hand. An electric-motor $m$ is here shown, having a controller $m'$, which takes its current from a power-wire $m^2$ in any usual or suitable manner.

Movement of the apparatus along over the drying-bed is necessary to enable it to properly perform its operation.

Referring to the block-turning-device, shown in Figs. 1, 2, 3 and 8, $d$ represents the block-lifting fingers, of which a large number will be employed, all made alike or substantially so, and arranged in parallel, in a row extended transversely with respect to the main frame and to the track on which the apparatus moves. As a convenient form of support for said fingers the block-turning board $d^{10}$, may be employed, which is arranged on a bar $d'$, attached at its ends to the extremities of a pair of parallel arms $d^2$, pivoted at $d^3$ to the frame. The fingers are made as short bars extended over the turning-board for a short distance, and attached to said board and to the bar which supports it. Said fingers are inclined and the turning board $d^{10}$ is correspondingly inclined, and said turning-board extends above the tops of the fingers for a short distance and forms a smooth uninterrupted top edge for the block-turning device over which the blocks are pushed as the apparatus advances.

In lieu of providing a turning-board $d^{10}$, the fingers may be supported directly on the bar $d'$, see Fig. 9, and made quite long and extended both forward and rearward of said bar, so that the tops of the fingers serve as a turning-means at the top of the block-turning device, over which the blocks are pushed. Such construction, however, does not present a smooth, uninterrupted turning edge for the blocks.

The arms $d^2$ bearing the block-turning-device are moved on their pivots to bodily raise and lower said device. As a means to move said arms $d^2$, rods $e$ may be loosely connected to them, see Fig. 3, which extend upward and have screw-threaded upper ends, as $e'$, which extend through screw-threaded center-holes in suitably supported worm-wheels $e^2$, which are arranged in the same plane, and are engaged by the opposite ends of a horizontal worm-shaft $e^3$, arranged transversely with respect to the frame, and which extends from side to side thereof, and has fixed to it a hand-wheel $e^5$ or other convenient means for turning it. Rotary movement of the worm-shaft in one or the other direction turns the worm-wheels and causes upward or downward movement of the rods $e$ to raise or lower the block-turning-device.

Suitable guides may be provided for said arms $d^2$, if desired, such for instance as vertical plates $f$, arranged on said arms, which engage vertical plates $f'$ fixed to and depending from the main frame.

In operation the block-turning device will be adjusted to the proper elevation whereby the lower forward ends of the fingers will penetrate or just sink into the surface of the bed, far enough to enable the forward ends of the fingers, when advanced, to project beneath the blocks; and the rear edge of the block-turning board, or, in the modification here shown, the rear ends of said fingers are set at an elevation, whereby the distance between said board or fingers and the bed corresponds approximately to the length of a block or thereabout. Slight variations, of course, are immaterial.

As the apparatus is advanced the forward extremities of the fingers project beneath the partially dried blocks, which may have inclined or beveled ends, see Fig. 8, and act to lift said blocks and cause them to pass onto the fingers, and the succeeding blocks push the blocks first lifted ahead of them along on the fingers and the turning-board until finally the blocks fall over the top of said board, turning as they fall, so that usually they strike endwise on the bed, on their acute angled corners, whereupon, owing to their shape and the turning motion imparted to them, they immediately tip over in a rearward direction. The entire turning operation results in turning the blocks bottom side up, and, as will be noted, is accomplished in part by the turning motion obtained in falling from the top of the turning-device, and in part by striking endwise on the bed on their acute angled corners.

I claim:—

1. In an apparatus for turning peat blocks, the combination of a block-turning-device comprising a set of inclined fingers to lift the blocks and inclined turning-means at the rear thereof, and means to advance said device to project the forward ends of the fingers beneath the blocks and cause succeeding blocks to push the blocks ahead of them along on the fingers and inclined turning-means and over the top of said inclined turning-means, permitting them to fall by gravity, substantially as described.

2. In an apparatus for turning peat blocks, the combination of a block-turning-device comprising a set of inclined fingers and an inclined turning board, and means to advance said device to project the forward ends of the fingers beneath the blocks and cause succeeding blocks to push the blocks ahead of them along on the fingers and board and over the top of said board, permitting them to fall by gravity, substantially as described.

3. In an apparatus for turning peat blocks, the combination of a block-turning-device having inclined lifting fingers and turning-means, an adjustable frame bearing said device, means to adjust said frame to different elevations, and means to advance the block-turning-device to project the forward ends of the fingers beneath the blocks and cause succeeding blocks to push the blocks ahead of them along on the fingers and turning-means and over the top of said turning-means, permitting them to fall by gravity, substantially as described.

4. In an apparatus for turning peat-blocks having beveled ends, the combination of a block-turning-device having inclined lifting-fingers and turning-means, arranged with the top edge of the turning-means elevated above the drying-field a distance approximately equal to the length of a block, and means to advance said block-turning-device to project the forward ends of the fingers beneath the blocks and cause succeeding blocks to push the blocks ahead of them over the top of the turning-means, permitting them to fall by gravity and their acute angled corners to strike the bed, substantially as described.

5. An apparatus for turning peat blocks comprising a car adapted to run on rails, a block-turning device on said car arranged crosswise to the line of motion of the car having its forward end adjustable with relation to the surface of a peat-drying bed arranged between said rails so as to pass beneath the peat-blocks arranged on said bed, an inclined portion to receive the picked-up blocks, and permit them to pass upwardly and rearwardly as they are pushed by the blocks subsequently picked up, and a rear edge arranged crosswise to the line of motion of the car from which said raised blocks are dropped rearwardly with a turning motion which causes them to fall to the ground and rest on the reverse side from that on which they rested before being picked up, and means for raising and lowering said block-turning device, substantially as described.

In testimony whereof, I have signed my name to this specification, in the presence of two subscribing witnesses.

THOMAS A. MIGHILL.

Witnesses:
B. J. NOYES,
H. B. DAVIS.

---

Copies of this patent may be obtained for five cents each, by addressing the "Commissioner of Patents, Washington, D. C."